US008428198B2

(12) United States Patent
Vrcelj et al.

(10) Patent No.: US 8,428,198 B2
(45) Date of Patent: Apr. 23, 2013

(54) FREQUENCY TRACKING WHICH ADAPTS TO TIMING SYNCHRONIZATION

(75) Inventors: Bojan Vrcelj, San Diego, CA (US); Raghuraman Krishnamoorthi, San Diego, CA (US); Seong Taek Chung, Redwood City, CA (US); Fuyun Ling, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1069 days.

(21) Appl. No.: 11/376,986

(22) Filed: Mar. 15, 2006

(65) Prior Publication Data

US 2007/0217525 A1 Sep. 20, 2007

(51) Int. Cl.
*H04L 27/06* (2006.01)
(52) U.S. Cl.
USPC .......................................... 375/344; 370/206
(58) Field of Classification Search .................. 375/344
See application file for complete search history.

(56) References Cited

U.S. PATENT DOCUMENTS

| | | | |
|---|---|---|---|
| 6,407,699 B1 * | 6/2002 | Yang | 342/357.59 |
| 6,859,641 B2 * | 2/2005 | Collins et al. | 455/63.1 |
| 7,027,429 B2 | 4/2006 | Laroia et al. | |
| 7,149,266 B1 * | 12/2006 | Imamura et al. | 375/355 |
| 7,421,013 B1 * | 9/2008 | Lee et al. | 375/149 |
| 2002/0196731 A1 * | 12/2002 | Laroia et al. | 370/206 |
| 2004/0184551 A1 * | 9/2004 | Liu et al. | 375/260 |
| 2005/0084035 A1 | 4/2005 | Kim et al. | |
| 2006/0233097 A1 | 10/2006 | Vrcelj et al. | |

FOREIGN PATENT DOCUMENTS

| | | |
|---|---|---|
| EP | 1179901 A1 * | 2/2002 |
| EP | 1 220 505 A2 | 7/2002 |
| JP | 2000151546 A | 5/2000 |
| JP | 2002217865 A | 8/2002 |
| JP | 2003503944 A | 1/2003 |
| JP | 2004214962 A | 7/2004 |
| WO | WO0070802 A1 | 11/2000 |
| WO | WO0103347 | 1/2001 |
| WO | WO2005074224 | 8/2005 |
| WO | 2006/099532 A2 | 9/2006 |

OTHER PUBLICATIONS

Mody, Apurva N.; Stuber, Gordon L., "Receiver Implementation for a MIMO OFDM system" IEEE Global Telecommunications Conference, vol. 1 of 3, Nov. 17, 2002, pp. 716-720.
Mody A N, Stuber G L: "Receiver implementation for a MIMO OFDM System" IEEE Global Telecommunications Conference, vol. 1 of 3, Nov. 17, 2002, pp. 716-720, New York, NY : IEEE, US, ISBN: 0- 7803-7632-3.
International Search Report and Written Opinion—PCT/US2007/064022, International Search Authority—European Patent Office—Jun. 8, 2007.

* cited by examiner

*Primary Examiner* — Lihong Yu
(74) *Attorney, Agent, or Firm* — Fulbright & Jaworski L.L.P.

(57) ABSTRACT

A frequency tracking method and apparatus is provided. A receiver receives OFDM symbols and determines associated frequency offset. A frequency error estimator selects a cross correlation window for determining frequency offset based on timing offset. A symbol timing estimator is used to determine the timing offset.

18 Claims, 9 Drawing Sheets

FREQUENCY TRACKING WHICH ADAPTS TO TIMING SYNCHRONIZATION

BACKGROUND

1. Field

The present disclosure relates generally to telecommunications, and more specifically to frequency tracking techniques in wireless communications.

2. Background

Receiving a signal transmitted over a wireless communication channel typically involves correcting for frequency offset. The frequency offset may be caused by various problems, such as, for example, the different oscillator frequencies at the transmitter and receiver, communication channel errors, Doppler shift, or other communication problems. Frequency tracking for OFDM symbols, used to detect frequency offset, is commonly implemented based on a cross-correlation between samples in an OFDM symbol. OFDM symbols are usually formed to have a direct correlation between the beginning and the end of the symbol.

In dynamic communication environments, OFDM symbol boundaries may change from one symbol to another. However, conventional frequency tracking methods treat symbol boundaries as if they were constant. Accordingly, there is a need in the art for an improved frequency tracking process that considers the changing symbol boundaries when tracking and correcting for frequency offset.

SUMMARY

One aspect of a receiver is configured to dynamically track frequencies in a communications system includes a frequency error estimator configured to select a cross correlation window and to determine a frequency offset associated with a received symbol, and a time tracking device configured to determine a timing offset associated with the received symbol, and a demodulator, wherein the frequency error estimator selects a correlation window based, at least in part, on data provided by the time tracking device.

One aspect of a frequency tracking apparatus configured to dynamically track frequencies in a wireless communications network includes a correlation mechanism configured to calculate a frequency offset associated with a received data symbol and a frequency control window determination unit configured to determine a plurality of samples from the received data symbol to be used in calculating the frequency offset, wherein the frequency control window determination unit receives data indicating a timing offset and the plurality of samples is based on the timing offset.

One aspect of a method for determining a frequency offset at a wireless communications receiver is disclosed, wherein the receiver receives an OFMD symbol, includes determining whether there is a timing offset associated with the OFDM symbol and determining a frequency offset associated with the OFDM symbol, wherein if there is a timing offset, the amount of timing offset is used in determining the frequency offset.

An aspect of computer readable storage media containing a set of instructions for a processor to perform a method of determining a frequency offset at a wireless communications receiver is disclosed. The set of instructions includes a routine to receive data indicating a timing offset associated with a data symbol, a routine to choose a plurality of samples from the data symbol based, at least in part, on the timing offset, and a routine to perform a cross-correlation operation using the chosen plurality of samples to determine the frequency offset.

Another aspect of a receiver includes means for receiving data indicating a timing offset associated with a data symbol, means for choosing a plurality of samples from the data symbol based, at least in part, on the timing offset, and means for performing a cross-correlation operation using the chosen plurality of samples to determine the frequency offset.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

A frequency tracking device and method are provided for determining frequency offset in a wireless telecommunications system. The device and method may be implemented using any one or more types of telecommunications systems, such as multiple access systems. Examples of multiple access systems include code division multiple access (CDMA), orthogonal frequency division multiplexing (OFDM), and other multiple access methods. Exemplary embodiments are presented below incorporating an OFDM system.

Figure 1:
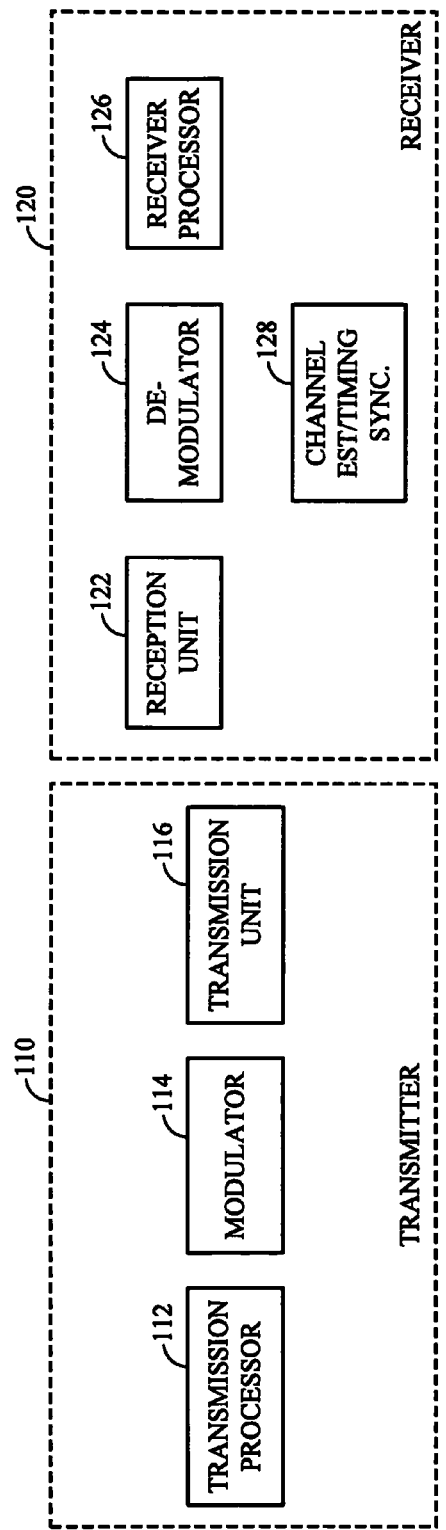
FIG. 1 is a conceptual block diagram illustrating an example of a transmitter in communication with a receiver.

FIG. 1 depicts a conceptual block diagram of a transmitter 110 in communication with a receiver 120 in a communications network. Transmitter 110 may include a transmission processor 112, a modulator 114, and a transmission unit 116. Receive 120 may include a reception unit 122, a demodulator 124, a receiver processor 126, and a channel estimation/timing synchronization unit 128.

Transmission processor 112 receives incoming data and processes the data to generate a plurality of data symbols. Pilot data may also be processed to generate pilot symbols. Processing the data may include encoding the data using one or more known communication encoding schemes. The processed data symbols are then sent to modulator 114.

Modulator 114 multiplexes the data and pilot symbols onto the proper subbands and symbols periods to generate modulated symbols. Transmission unit 116 converts the modulated symbols into analog signals. Transmission unit 116 may also be configured to amplify, filter, and frequency upconvert the analog signals to generate a modulated signal. The modulated signal may be transmitted to receiver 120 via an antenna.

The modulated signal from transmitter 110 may be received by an antenna and provided to reception unit 122. Reception unit 122 processes the received signal and digitizes the processed signal to produce a stream of input samples. Processing may include filtering, amplifying, and down-converting the signal.

A demodulator 124 performs demodulation on the input samples to obtain received data and pilot symbols. Demodulator 124 may also perform detection on the received symbols with a channel estimate to obtain data symbols, which are estimates of the data symbols sent by transmitter 110. Demodulator 124 provides the detected symbols to receiver processing unit 126, which processes the detected data symbols and provides decoded data.

Channel estimation/timing synchronization unit 128 receives input samples from reception unit 122 and processes the samples to determine a channel estimate and symbol timing. The symbol timing and channels estimate are provided to demodulator 124 and may be provided to receiver processing unit 126. Demodulator 124 may use the symbol timing to demodulate the samples and the channel estimate to detect the received data symbols.

Orthogonal Frequency Division Multiplexing (OFDM) is an example of a technology that can be implemented by a telecommunications system. OFDM is a technique that distributes data over a large number of carriers spaced apart at precise frequencies. The spacing provides the "orthogonality" that prevents a receiver from seeing frequencies other than those intended for the receiver. Other telecommunications technologies may be used.

Figure 2:
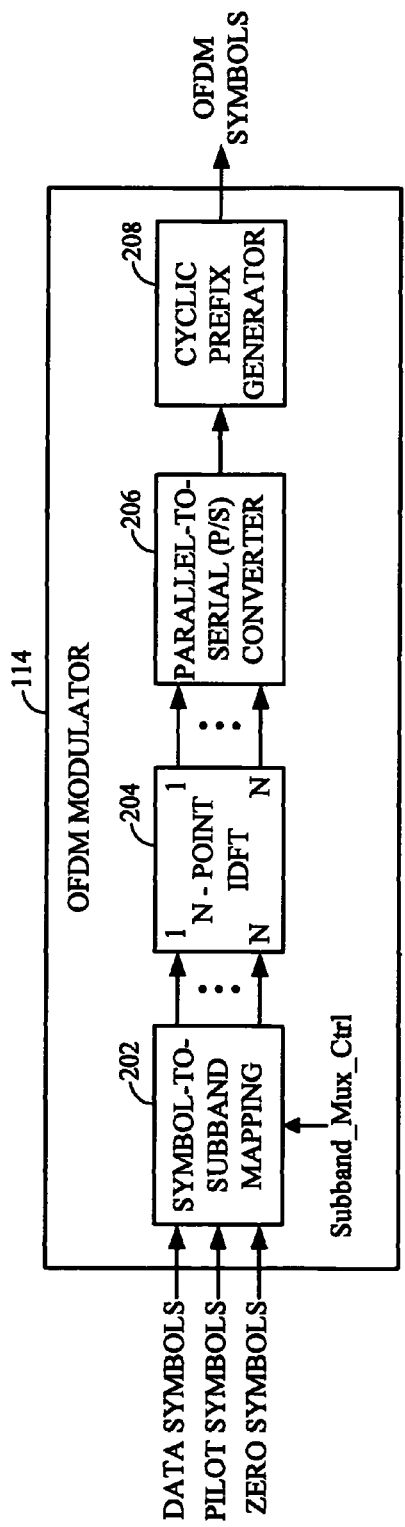
FIG. 2 is a conceptual block diagram illustrating the functionality of an OFDM modulator.

FIG. 2 depicts an OFDM modulator 114. OFDM modulator 200 may include a symbol-to-subband mapping unit 202, an inverse discrete Fourier transform (IDFT) unit 204, a parallel-to-serial converter 206, and a cyclic prefix generator 208.

Processed symbols, in the form of data, pilot, and zero symbols are provided to a symbol-to-subband mapping unit 202. Symbol-to-subband mapping unit 202 maps these symbols onto the proper subband based on a supplied subband controller signal. For each OFDM symbol period, mapping unit 202 provides one data or pilot symbol on each subband used for data or pilot transmission and a zero signal for each unused subband. Additionally, mapping unit 202 provides N transmit symbols for N total subbands, where each transmit symbol may be a data symbol, a pilot symbol, or a zero symbol.

An inverse discrete Fourier transform (IDFT) unit 204 receives the transmit symbols for each symbol period and transforms the transmit symbols to the time domain with an N-point IDFT, and provides a transformed symbol containing N time-domain samples. Each sample is a complex value to be sent in one sample period. An N-point inverse fast Fourier transform (IFFT) may be performed in place of the IDFT if N is a power of two.

A parallel-to-serial converter (P/S) 206 serializes the N samples for each transformed symbol. A cyclic prefix generator 208 then inserts a replica of the ending portion of cyclic prefix samples of the transformed symbol at the beginning of the symbol. The generated cyclic prefix is used to combat inter-symbol interference and intercarrier interference caused by a long delay spread in the communication channel. In one embodiment, the cyclic prefix may have a length 512, while the transformed symbol size in N=4096 samples.

Figure 3:
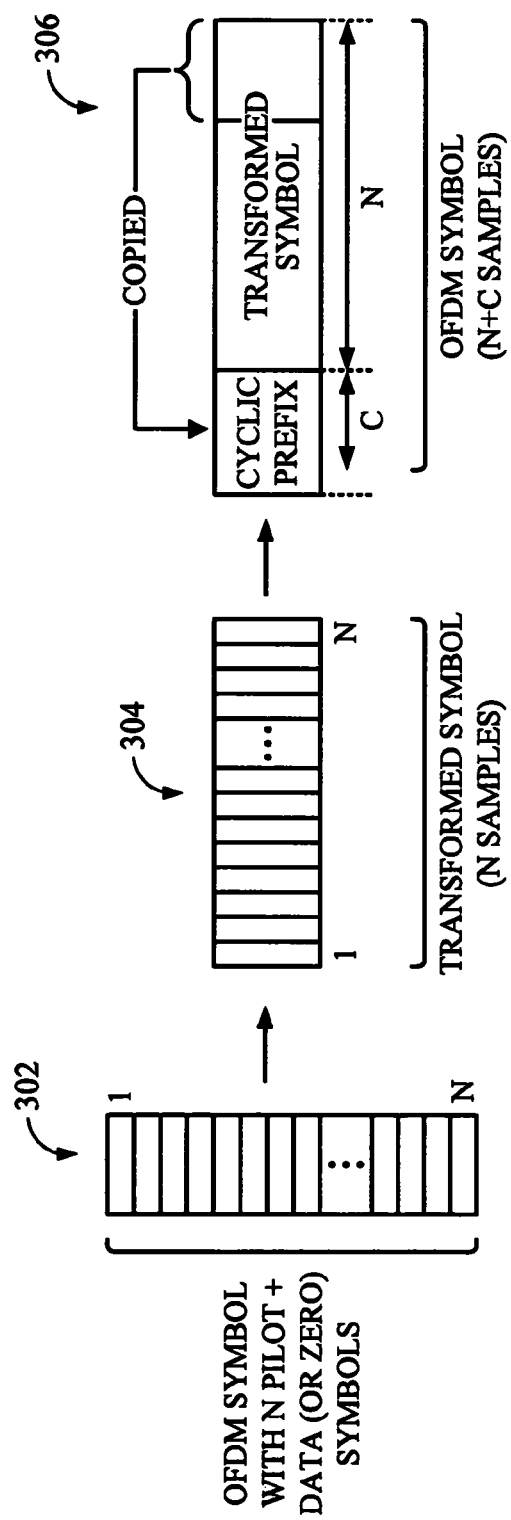
FIG. 3 is a graphical illustration of an OFDM symbol.

FIG. 3 depicts a graphical example of an OFDM symbol. As depicted at 302, N pilot/data/zero symbols received by symbol-to-subband mapping unit 202 may be transformed by IDFT unit 204 and serialized to generate a transformed symbol having N samples, as depicted at 304. Cyclic prefix generator 208 completes the OFDM symbol by copying C samples from the end of the transformed symbol and placing these samples at the beginning of the symbol to form a cyclic prefix, as depicted at 306. The OFDM symbols has N+C samples.

Figure 4:
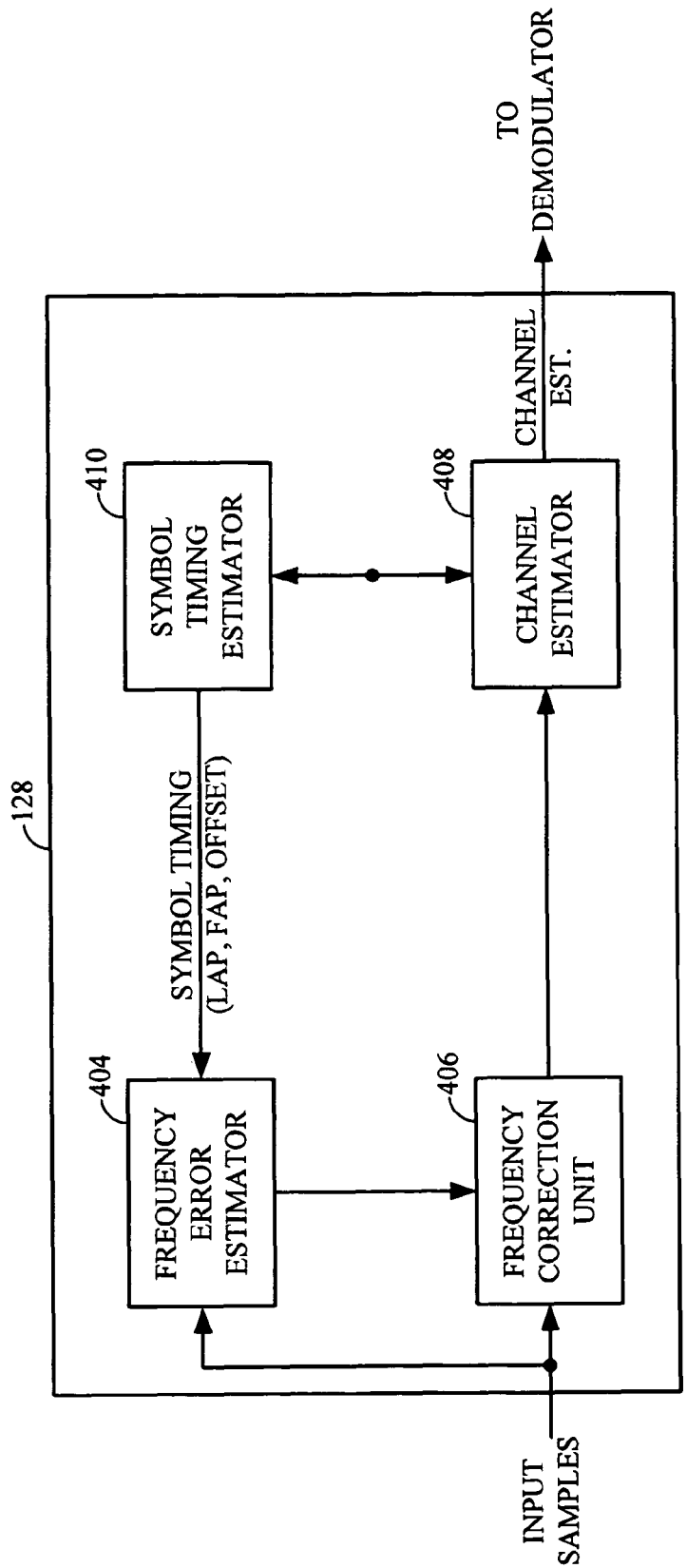
FIG. 4 is a conceptual block diagram of a synchronization/channel estimation block.

FIG. 4 depicts channel estimation/timing synchronization unit 128 in greater detail. Channel estimation/timing synchronization unit 128 may include a frequency error estimator 404, a frequency correction unit 406, a channel estimator 408, and a symbol timing estimator 410.

Input samples from reception unit 122 are provided to both frequency error estimator 404 and frequency correction unit 406. Frequency error estimator 404 may be configured to estimate the frequency offset present in the received OFDM symbols. This frequency offset may be due to various sources such as, for example, a difference in frequencies of the oscillators at the transmitter and receiver, Doppler shift, or other channel conditions. Frequency error estimator 404 may be configured to react to changes in symbol boundaries, as detected by symbol timing estimator 410, and may determine frequency offset based at least in part on these changes. Output of frequency error estimator 404 may be applied to frequency correction unit 406 to correct for the detected frequency offset.

Symbol timing detector 410 may be configured to estimate changes in symbol boundaries and to determine a timing offset associated with the changes. An OFDM sample counter (not shown) may be provided for keeping track of sample indexes. Symbol timing detector 410 may be configured to adjust the OFDM sample counter to correct for timing offset.

Figure 6:
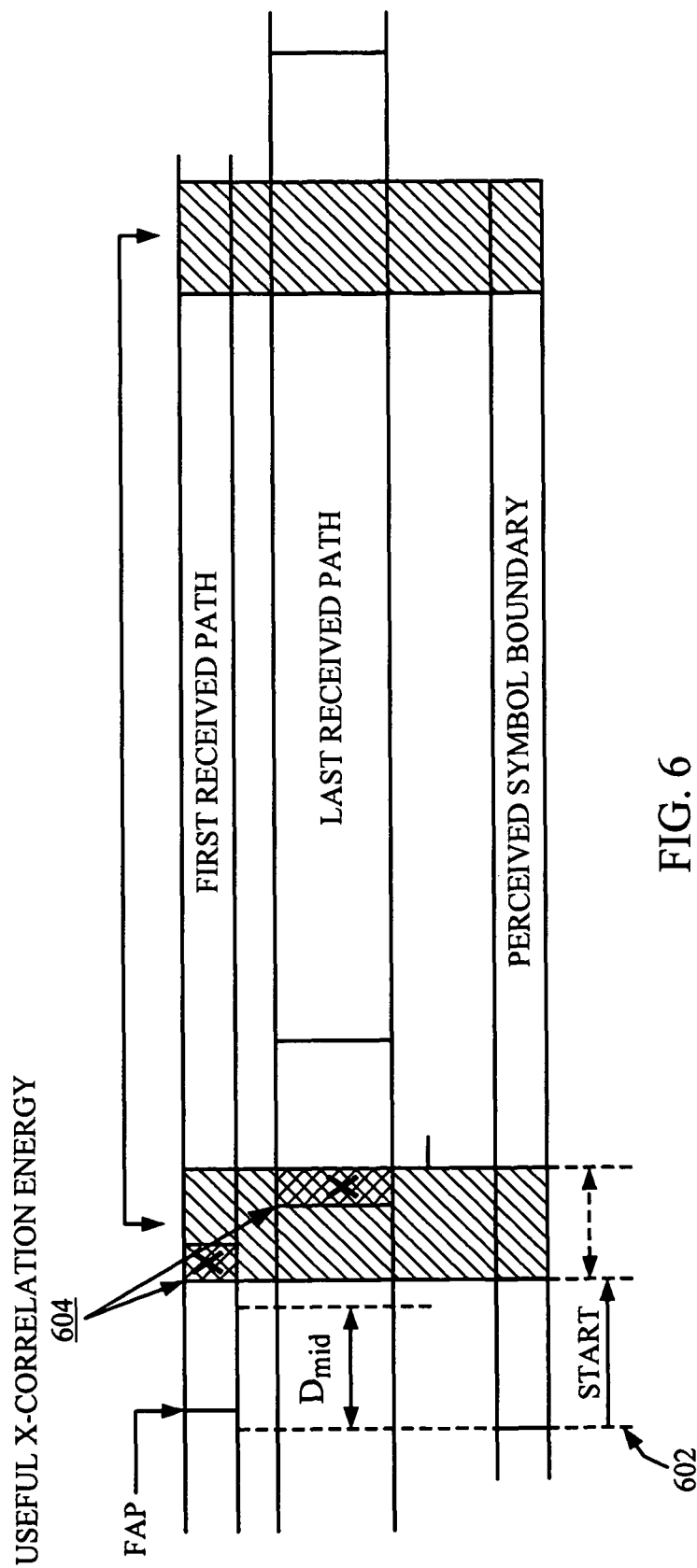
FIG. 6 is timing diagram illustrating the process of selecting a cross correlation window.

Channel estimator 408 may be configured to compute time domain channel estimates. Whenever a valid time domain channel estimate is available, channel estimator 408 may notify symbol timing detector 410 by sending a signal indicating that a channel estimate is ready. Channel estimator 408 may also be configured to send update requests to symbol timing detector 410 periodically. Upon receipt of an update request, and based on the time-domain channel estimate, symbol timing detector 410 calculates a timing offset. This timing offset may be fed back to channel estimator 408 and may also be provided to frequency error estimator 404, as described below. The timing offset is also used inside the demodulator 124, to determine the useful portion of N samples of the received OFDM symbol. Symbol timing detector 410 may also provide frequency error estimator 404 with information indicating the first and last symbol arriving paths (FAP and LAP, respectively). FAP is a delay in the arrival of the first reflection path from the transmitter, with respect to the current timing reference, which is given by the perceived symbol boundary. Similarly, LAP is a delay in the arrival of the last reflection path from the transmitter, with respect to the current timing reference. This is depicted in FIG. 6.

Figure 5:
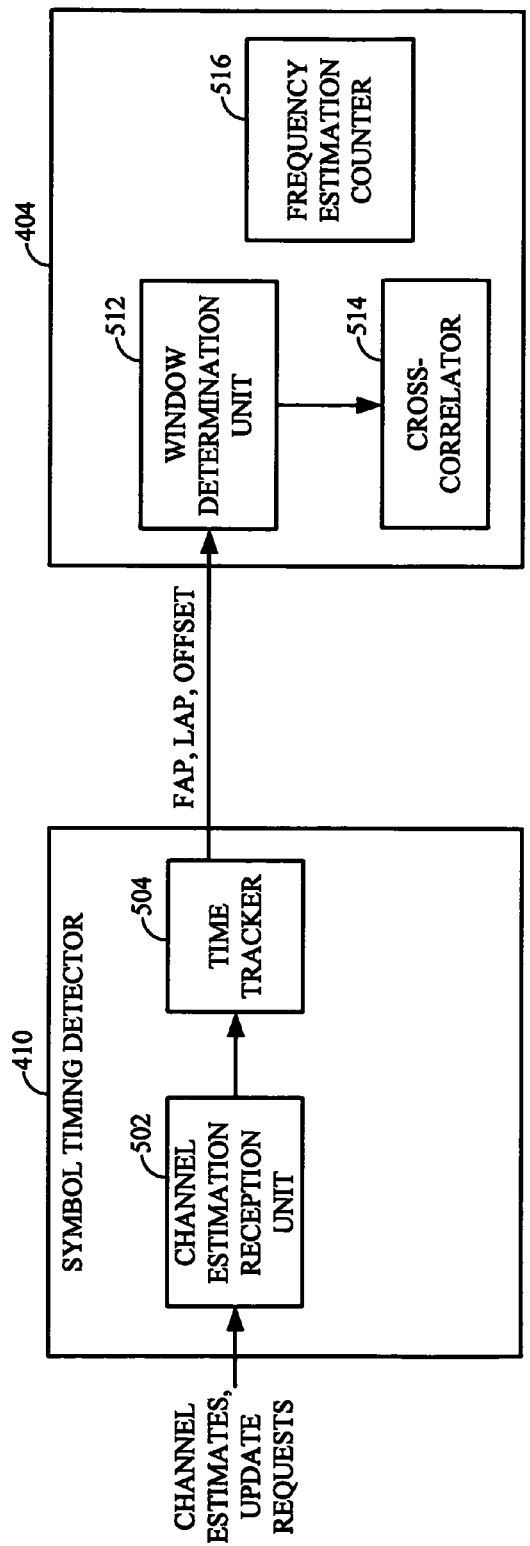
FIG. 5 is a conceptual block diagram of a symbol timing detector and a frequency error estimator.

FIG. 5 depicts an interaction between symbol timing detector 410 and frequency error estimator 404. Symbol timing detector 410 may include a channel estimation reception unit 502 and a time tracker 504. Frequency error estimator may include a correlation window determination unit 512, a cross-correlator 514, and a frequency estimation counter 516.

Channel estimation reception unit 502 may be configured to receive time domain channel estimates from channel estimator 408. Additionally, channel estimation reception unit 502 receives update requests from channel estimator 408. Upon receipt of an update request, channel estimation reception unit 502 notifies time tracker 504 of the need to determine a new timing offset. Time tracker 504 computes the timing offset and provides symbol timing information, such as FAP, LAP, and timing offset, to window determination unit 512 at frequency error estimator 404.

Window determination unit 512 may determine a number L of samples to be used in performing cross-correlation. Time tracker 504 provides timing offset information, as well as information indicating the first and last arriving symbol paths to window determination unit 512. According to some embodiments, L may be based on the timing offset. The association between the value of the timing offset and L may be configured by a user or administrator. One example of determining a value for L is as follows:

$$L = \begin{cases} CP, & \text{if offset} \geq 0 \\ \frac{3CP}{4}, & \text{if } -\frac{CP}{4} \leq \text{offset} < 0 \\ \frac{CP}{2}, & \text{if } -\frac{3CP}{4} \leq \text{offset} < -\frac{CP}{4} \end{cases}$$

Frequency estimation counter 516 may begin counting when a separate OFDM counter, described above and used to track sample indexes, reaches a calculated value start. L samples are then collected beginning at the time start. Start may be based on delay spread, the number of sample in the cyclic prefix, the first arriving path, and the sample window L. For example, start may be computed based on the following equation:

$$\text{start} = FAP - \text{offset} + \frac{D + CP - L}{2},$$

where FAP is the position of the first arriving path, offset is the number of samples in the timing offset, D is the delay spread, CP is the number of samples in the cyclic prefix, and L is the number of samples in the correlation window. A new value for start and L may be computed during the same OFDM symbol during which the time tracker computes a new value of offset.

Frequency estimation counter 516 begins counting from zero at the moment the OFDM sample counter reaches start and counts to N−1+L (where N is the symbol size), after which it stops. The samples used in the correlation window L are those which correspond to frequency estimation counter 516 values [0,L−1] and [N−1+L].

Cross-correlator 514 performs a cross-correlation operation, using the determined samples, to determine a frequency offset. A frequency offset for the $m^{th}$ OFDM symbol may be calculated using the following equation:

$$\Delta \hat{f}_m = \frac{1}{G_D} \text{Im} \left[ \sum_{k=0}^{511} r_{m,k}^* r_{m,k+4096} \right],$$

where $\Delta \hat{f}_m$ is the frequency offset, $G_D$ is the detector gain, r is the received sample of the OFDM symbol, and k is the sample index.

Referring now to FIG. 6, a process for selecting an cross-correlation window for determining a frequency error estimate when no timing offset is provided will be described. As depicted at 602, OFDM counter begins counting at the perceived symbol boundary. Using the LAP and FAP information available from the time tracker, a desirable set of samples may be selected for frequency cross-correlation.

The correlation window may be chosen such that equal portions of the cyclic prefix content from the first and last arriving paths are being used. This is depicted as useful cross-correlation energy 604. As depicted, the amount of useful samples x is given by $$x = \frac{1}{2}(L + CP - D),$$

where L is the number of samples in the correlation, CP is the cyclic prefix, and D is the delay spread. Because there is no timing offset, the starting sample index is then given $$\text{by start} = FAP + D + x - L = FAP + \frac{1}{2}(D + CP - L).$$

Figure 7:
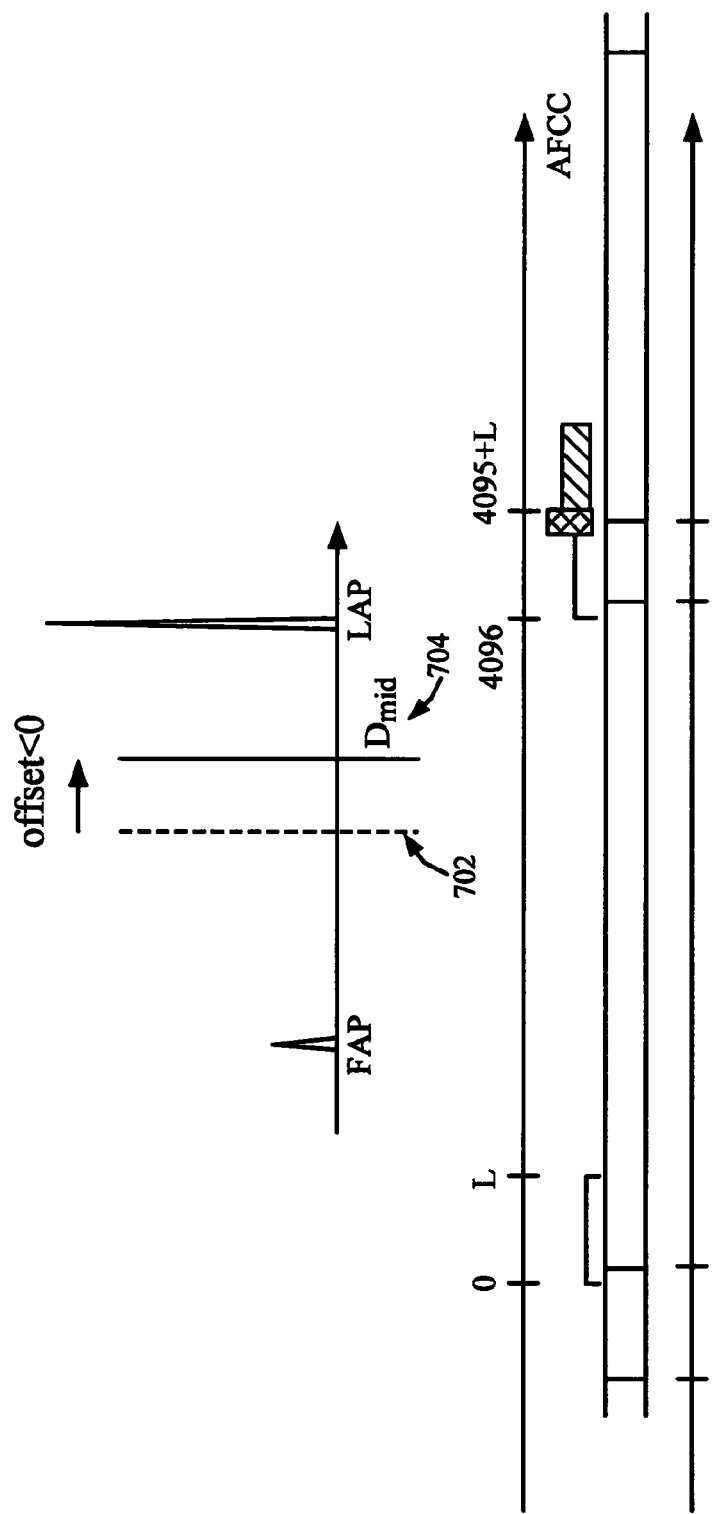
FIG. 7 is a timing diagram illustrating the process of selecting a cross correlation window when there is a timing offset.

FIG. 7 depicts a case where a timing offset is non-zero. Assume symbol timing estimator has detected a change in symbol boundary and has calculated a timing offset less than zero. The resulting change in the OFDM symbol boundary is captured by the OFDM sample counter, which is adjusted to reflect the offset. That is, the timing offset is subtracted from the current OFDM sample counter value.

The actual midpoint between FAP and LAP is depicted at 702. However, the desirable midpoint may be located at $D_{mid}$, depicted at 704, and this results in the shift of the perceived symbol boundary by the amount of timing offset. There is a correlation between the location of the channel and the placement of the symbol boundaries.

As depicted in FIG. 7, the value of L is almost equal to CP. As such, the OFDM sample counter correction due to the offset, made at the counter rollover point, caused the second correlation region of the previous symbol to overlap with the first correlation region of the current symbol. From this, it is clear that L should be less than CP to avoid buffering problems. However, L is selected such that there is some overlap with the useful correlation energy. According to one embodiment of the disclosure, rather than varying L as described above, L may be kept at a predetermined value, such as 384, whenever a timing correction at the end of the current symbol is anticipated. In some embodiments, L may be kept at a constant value for all symbols except where the timing offset is being applied. In yet other embodiments, L may be determined so as to always correspond to the maximum value which does not lead to buffering problems. For example, L may be defined as L=min{CP, CP+offset}.

Figure 8:
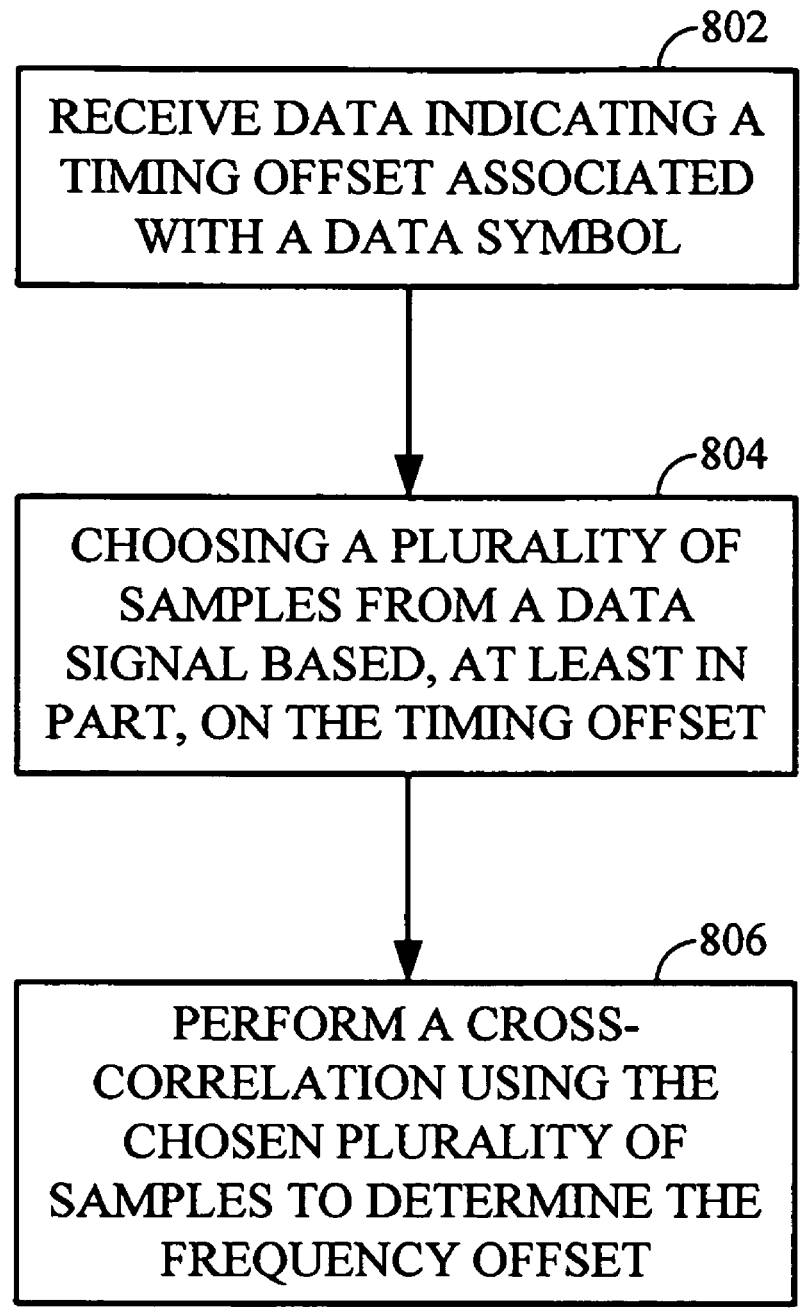
FIG. 8 is a flow chart illustrating the operation of a frequency error estimator.

FIG. 8 is a flow chart illustrating the operation of a frequency error estimator. In step 802, data indicating a timing offset associated with a data symbol is received. In step 804, a plurality of samples from the data symbol is chosen based, at least in part, on the timing offset. In step 806, a cross-correlation operation is performed using the chosen plurality of samples to determine the frequency offset.

Figure 9:
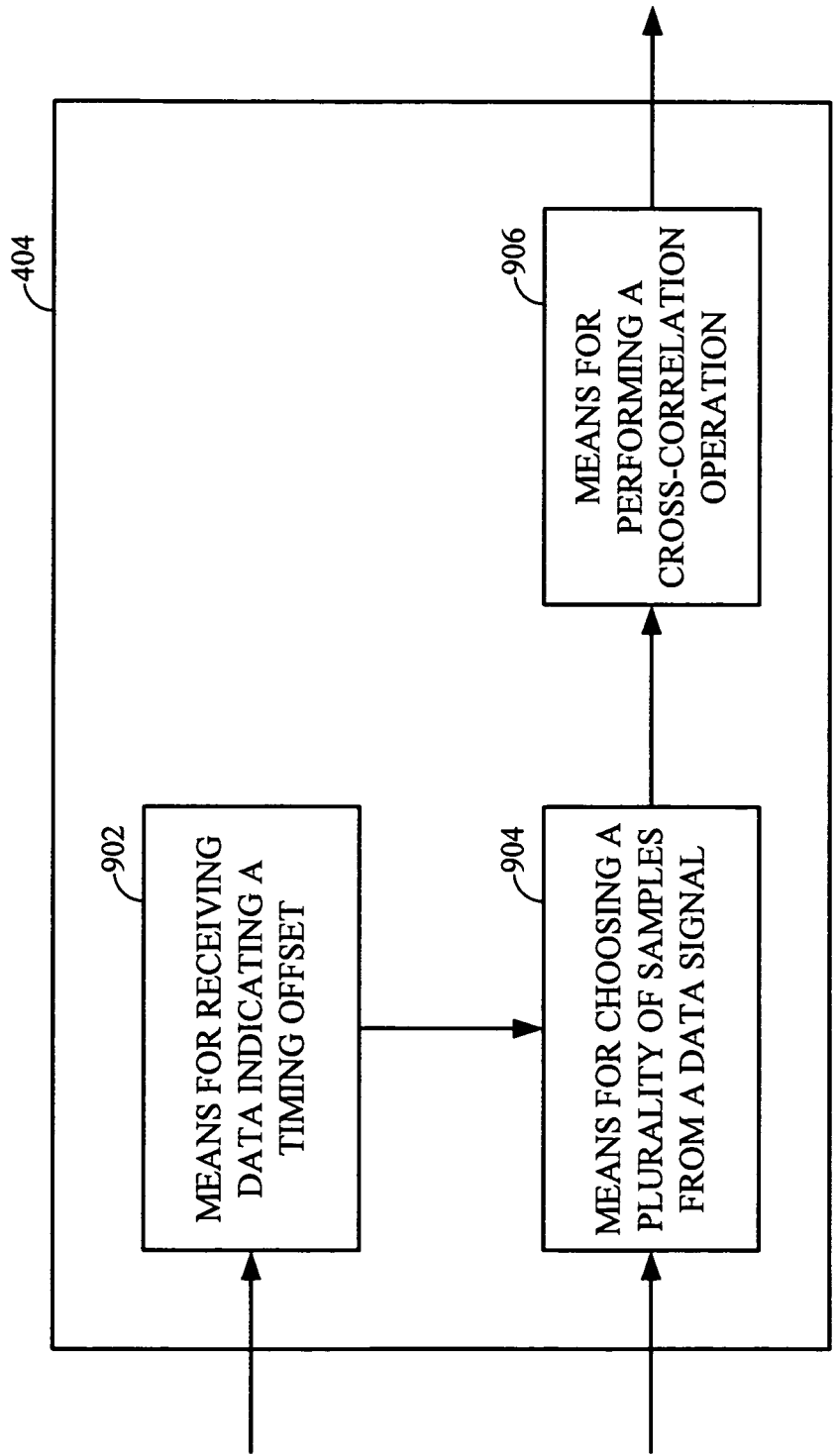
FIG. 9 is a conceptual block diagram of a frequency error estimator.

FIG. 9 is a conceptual block diagram of a frequency error estimator. The frequency error estimator 404 includes means for receiving data indicating a timing offset associated with a data symbol 902 and means for choosing a plurality of samples from the data symbol 904. The plurality of symbols are chosen based, at least in part, on the timing offset. The frequency error estimator 404 further includes means for performing a cross-correlation operation 906. The cross-correlation operation using the chosen plurality of samples to determine a frequency offset.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A receiver configured to dynamically track frequency offsets in a communications system, comprising:
    a time tracking device configured to detect a change in symbol boundary and determine a timing offset associated with a symbol received during a time period from a plurality of samples of the symbol received during the time period, wherein the timing offset corresponds to the detected change in the symbol boundary; and
    a frequency error estimator configured to select a number of samples to be included in a cross correlation window based, at least in part, on the timing offset, and to determine a frequency offset by performing a cross-correlation exclusively between samples of the symbol received during the time period that are in the selected window.

2. The receiver of claim 1, wherein the frequency error estimator is configured to select the number of samples to be used in the cross correlation window based on a delay spread between a first arriving sample path and a last arriving sample path and the determined timing offset.

3. The receiver of claim 1, wherein the received symbol is an OFDM symbol having a cyclic prefix that is replicated at an end of the OFDM symbol, and the frequency offset is determined by performing a cross correlation operation between a plurality of samples in the cyclic prefix and the replica of the plurality of samples in the cyclic prefix.

4. The receiver of claim 3, wherein the frequency error estimator includes a counter configured to select the number of samples to be used in the cross correlation window, wherein the counter begins counting at a position start, which is determined based, at least in part, on a position of a first arriving sample path, a timing offset, and an estimated channel delay spread.

5. The receiver of claim 1, wherein the frequency error estimator comprises a frequency locked loop.

6. A frequency tracking apparatus configured to dynamically track frequencies in a wireless communications network, comprising:
    a correlation mechanism configured to calculate a frequency offset associated with a data symbol received during a symbol period by performing a correlation exclusively between a plurality of samples of the data symbol received during the symbol period; and
    a frequency control window determination unit configured to determine the plurality of samples from the data symbol received during the symbol period to be used in calculating the frequency offset, wherein the frequency control window determination unit receives data indicating a timing offset and the plurality of samples is based on the timing offset, wherein the timing offset indicates a change in symbol boundary,
    wherein a number of samples used to calculate the frequency offset is determined based, at least in part, on the timing offset.

7. The frequency tracking apparatus of claim 6, wherein the plurality of samples is chosen to include content from a cyclic prefix associated with a first arriving symbol path and a last arriving symbol path.

8. The frequency tracking apparatus of claim 7, wherein the plurality of samples includes an equal number of samples from the cyclic prefix associated with the first arriving symbol path and the last arriving symbol path.

9. The frequency tracking apparatus of claim 6, wherein the number of samples used to calculate the frequency offset is constant.

10. The frequency tracking apparatus of claim 6, wherein the number of samples used to calculate the frequency offset is less than the number of samples in the cyclic prefix.

11. The frequency tracking apparatus of claim 6, further comprising:
    a counter configured to determine a position of a first sample of the plurality of samples used to calculate the frequency offset.

12. The frequency tracking apparatus of claim 11, wherein the counter begins counting at a starting index which is determined based, at least in part, on the position of a first arriving sample path, a timing offset, and an estimated channel delay spread.

13. The frequency tracking apparatus of claim 6, wherein the data symbol is an OFDM symbol.

14. A method for determining a frequency offset at a wireless communications receiver, wherein the receiver receives an OFDM symbol during a time period, comprising the steps of:
  receiving data indicating a timing offset associated with the OFDM symbol, wherein the timing offset corresponds to a detected change in symbol boundary;
  choosing a number of a plurality of samples from the OFDM symbol received during the time period based, at least in part, on the timing offset; and
  performing a cross-correlation operation exclusively between the chosen number of the plurality of samples of the OFDM symbol received during the time period to determine a frequency offset associated with the OFDM symbol.

15. The method of claim 14, further comprising:
  receiving values indicating the starting sample index for the first arriving sample path and the last arriving sample path; and
  wherein the chosen number of the plurality of samples includes samples from the first arriving sample path and the last arriving sample path.

16. The method of claim 14, wherein the chosen number of the plurality of samples represents a first correlation window and a second correlation window is chosen to start 4096 samples after the end of the first correlation window.

17. A non-transitory computer readable storage media containing a set of instructions for a processor to perform a method of determining a frequency offset at a wireless communications receiver, comprising:
  a routine to receive data indicating a timing offset associated with a data symbol received during a time period, wherein the timing offset indicates a change in symbol boundary;
  a routine to choose a number of a plurality of samples from the data symbol received during the time period based, at least in part, on the timing offset; and
  a routine to perform a cross-correlation operation exclusively using the chosen number of the plurality of samples of the data symbol received during the time period to determine the frequency offset.

18. A frequency error estimator, comprising:
  means for receiving data indicating a timing offset associated with a data symbol received during a time period, wherein the timing offset indicates a change in symbol boundary;
  means for choosing a number of a plurality of samples from the data symbol received during the time period based, at least in part, on the timing offset; and
  means for performing a cross-correlation operation exclusively using the chosen number of the plurality of samples of the data symbol received during the time period to determine the frequency offset.

* * * * *